United States Patent
Pyun et al.

(10) Patent No.: US 10,950,197 B2
(45) Date of Patent: Mar. 16, 2021

(54) DATA DRIVER, DISPLAY DEVICE HAVING THE SAME, AND METHOD OF DRIVING THE DISPLAY DEVICE

(71) Applicant: Samsung Display Co., Ltd., Yongin-si (KR)

(72) Inventors: Kihyun Pyun, Gwangmyeong-si (KR); Keunoh Kang, Uijeongbu-si (KR); Moonshik Kang, Hwaseong-si (KR); Gwangsoo Ahn, Suwon-si (KR); Dae-sik Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 16/569,562

(22) Filed: Sep. 12, 2019

(65) Prior Publication Data

US 2020/0098330 A1 Mar. 26, 2020

(30) Foreign Application Priority Data

Sep. 21, 2018 (KR) ........................ 10-2018-0113571

(51) Int. Cl.
*G09G 5/00* (2006.01)
*G06F 1/08* (2006.01)

(52) U.S. Cl.
CPC .................. *G09G 5/00* (2013.01); *G06F 1/08* (2013.01); *G09G 2310/0275* (2013.01)

(58) Field of Classification Search
CPC .... G09G 5/00; G09G 2310/0275; G06F 1/08; G06F 17/5036
USPC ................................................... 345/204, 690
See application file for complete search history.

(56) References Cited

U.S. PATENT DOCUMENTS

| | | | |
|---|---|---|---|
| 9,288,087 B2 | 3/2016 | Shin et al. | |
| 9,691,316 B2 * | 6/2017 | Pyun | ........................ G09G 3/20 |
| 9,898,997 B2 * | 2/2018 | Baek | ...................... G09G 5/008 |
| 9,984,189 B2 | 5/2018 | Chen | |
| 10,218,444 B2 | 2/2019 | Gopalakrishnan et al. | |
| 10,380,971 B2 * | 8/2019 | Oh | ......................... G09G 5/006 |
| 2006/0023779 A1 | 2/2006 | Kwak et al. | |

FOREIGN PATENT DOCUMENTS

| | | |
|---|---|---|
| KR | 10-0633780 B1 | 10/2006 |
| KR | 10-2013-0043559 A | 4/2013 |
| KR | 10-1739970 B1 | 5/2017 |

\* cited by examiner

*Primary Examiner* — Calvin C Ma
(74) *Attorney, Agent, or Firm* — Lewis Roca Rothgerber Christie LLP

(57) ABSTRACT

A data driver of a display device includes an equalizer and an equalizer controller. The equalizer controller calculates a lock time during a training enable signal is in an active state while sequentially changing a set signal applied to the equalizer to one option code selected from among a plurality of option codes and provides an option code corresponding to a set lock time among the option codes to the equalizer as the set signal.

20 Claims, 7 Drawing Sheets

_US 10,950,197 B2_

DATA DRIVER, DISPLAY DEVICE HAVING THE SAME, AND METHOD OF DRIVING THE DISPLAY DEVICE

CROSS-REFERENCE TO RELATED APPLICATION

This application claims priority to an the benefit of Korean Patent Application No. 10-2018-0113571, filed on Sep. 21, 2018, in the Korean Intellectual Property Office, the entire content of which is incorporated herein in its entirety by reference.

BACKGROUND

1. Field

The present disclosure relates to a data driver that drives a display panel, a display device including the data driver, and a method of driving the display device.

2. Description of the Related Art

In general, a display device includes a display panel (displaying an image), a timing controller, a data driving circuit, and a gate driving circuit. The timing controller, the data driving circuit, and the gate driving circuit drive the display panel. The display panel includes gate lines, data lines, and pixels. The data driver outputs data signals to the data lines, and the gate driver outputs gate signals to the gate lines. The timing controller controls the data driver and the gate driver.

The gate driver applies the gate signals having a gate-on voltage level to the gate lines and the data driver applies the data signals corresponding to image signals to the data lines, to thereby drive the display device to display an image.

The timing controller and the data driver are connected to each other through signal paths. It is desirable that the data driver reliably restore signals provided from the timing controller.

SUMMARY

According to one or more aspects of embodiments of the present disclosure, a data driver has optimal or desired reception performance.

According to one or more aspects of embodiments of the present disclosure, a display device has the data driver.

According to one or more aspects of embodiments of the present disclosure, a method of driving the display device optimizes or improves the reception performance of the data driver.

Embodiments of the inventive concept provide a data driver including an equalizer outputting an equalizer output signal in response to a transmission signal and a set signal, a clock and data recovery circuit recovering a clock signal and a data signal based on the equalizer output signal, a lock detector outputting a lock signal based on the equalizer output signal and the clock signal, a reset detector detecting a training pattern included in the transmission signal to output a reset signal, a training control circuit outputting a training enable signal, and an equalizer controller outputting the set signal based on the lock signal, the reset signal, and the training enable signal. The equalizer controller calculates a lock time during an active state of the training enable signal while sequentially changing the set signal applied to the equalizer to one option code of a plurality of option codes and provides an option code corresponding to a set lock time selected from among the option codes to the equalizer as the set signal when the training enable signal is deactivated.

The lock time is a time period from a time point at which the reset signal is enabled to a time point at which the lock signal is enabled.

The equalizer controller provides an option code having a lowest lock time selected from among the option codes to the equalizer as the set signal.

The reset detector outputs the reset signal enabled at a start time point of the training pattern included in the transmission signal.

The training enable signal is transited to the active state by the training control circuit when a set time elapses after a power source voltage begins to be supplied.

The equalizer controller includes a logic circuit receiving the training enable signal, the lock signal, and the reset signal to output a lock time signal, a selection signal generator outputting a selection signal in response to the reset signal, a plurality of lock time counter circuits respectively corresponding to the option codes, the plurality of lock time counter circuits being enabled in response to the selection signal, and outputting a plurality of count signals corresponding to a pulse width of the lock time signal, and a set signal output circuit outputting the option code corresponding to a count signal having a lowest value selected from among the plurality of count signals output from the plurality of lock time counter circuits as the set signal.

Each of the lock time counter circuits includes a counter outputting the count signal and a switch providing the lock time signal from the logic circuit to the counter in response to the selection signal, and the counter outputs the count signal corresponding to the pulse width of the lock time signal applied thereto through the switch.

The clock and data recovery circuit includes a clock recovery circuit to receive the equalizer output signal and outputting the clock signal and a data recovery circuit to recover the equalizer output signal to the data signal in synchronization with the clock signal.

The clock recovery circuit includes a phase detector detecting a difference in phase between the equalizer output signal and the clock signal, a charge pump generating a control current according to the detected phase difference, a loop filter generating a control voltage corresponding to the control current, and a voltage-controlled oscillator outputting the clock signal having a frequency corresponding to the control voltage, and setting a frequency of the clock signal to an initialization level in response to the reset signal.

Embodiments of the inventive concept provide a display device including a display panel including a plurality of gate lines, a plurality of data lines, and a plurality of pixels, each pixel of the plurality of pixels being connected to a corresponding gate line selected from among the plurality of gate lines and a corresponding data line of the data lines, a gate driver driving the gate lines, a data driver driving the data lines, and a timing controller controlling the gate driver and the data driver in response to a control signal and an image signal, converting the image signal and the control signal to a transmission signal, and transmitting the transmission signal to the data driver. The data driver includes an equalizer outputting an equalizer output signal in response to the transmission signal and a set signal, a clock and data recovery circuit recovery a clock signal and a data signal based on the equalizer output signal, a lock detector outputting a lock signal based on the equalizer output signal and the clock signal, a reset detector detecting a training pattern included in the transmission signal to output a reset signal, a training control circuit outputting a training enable signal, and an equalizer controller outputting the set signal based on the lock signal, the reset signal, and the training enable signal. The equalizer controller calculates a lock time during an active state of the training enable signal while sequentially changing the set signal applied to the equalizer to one option code of a plurality of option codes and provides an option code corresponding to a set lock time selected from among the option codes to the equalizer as the set signal when the training enable signal is deactivated.

The lock time is a time period from a time point at which the reset signal is enabled to a time point at which the lock signal is enabled.

The equalizer controller provides an option code having a lowest lock time among the option codes to the equalizer as the set signal.

The equalizer controller includes a logic circuit receiving the training enable signal, the lock signal, and the reset signal to output a lock time signal, a selection signal generator outputting a selection signal in response to the reset signal, a plurality of lock time counter circuits respectively corresponding to the option codes, the plurality of lock time counter circuits being enabled in response to the selection signal, and outputting a plurality of count signals corresponding to a pulse width of the lock time signal, and a set signal output circuit outputting the option code corresponding to a count signal having a lowest value selected from among the plurality of count signals output from the lock time counter circuits as the set signal.

Each of the plurality of lock time counter circuits includes a counter outputting the count signal and a switch providing the lock time signal from the logic circuit to the counter in response to the selection signal, and the counter outputs the count signal corresponding to the pulse width of the lock time signal applied thereto through the switch.

The clock and data recovery circuit includes a phase detector to detect a difference in phase between the equalizer output signal and the clock signal, a charge pump to generate a control current according to the detected phase difference, a loop filter to generate a control voltage corresponding to the control current, a voltage-controlled oscillator to output the clock signal having a frequency corresponding to the control voltage, and a data recovery circuit to recovery the equalizer output signal to the data signal in synchronization with the clock signal. The voltage-controlled oscillator sets the frequency of the clock signal to an initialization level in response to the reset signal.

Embodiments of the inventive concept provide a method of driving a display device including activating a training enable signal, initializing a set signal of an equalizer to one of a plurality of option codes, recovering a clock signal based on an equalizer output signal output from the equalizer, sequentially changing the set signal to one of the option codes to calculate a lock time of the clock signal corresponding to the plurality of option codes, and outputting an option code having a lowest lock time selected from among the plurality of option codes as the set signal.

The method further includes detecting a training pattern included in a transmission signal to output a reset signal.

The lock time is a time period from a time point at which the reset signal is enabled to a time point at which the clock signal reaches a target frequency.

The recovering the clock signal based on the equalizer output signal output from the equalizer includes detecting a difference in phase between the equalizer output signal and the clock signal, generating a control current according to the detected phase difference, generating a control voltage corresponding to the control current, and outputting the clock signal having a frequency corresponding to the control voltage. The outputting of the clock signal includes setting the frequency of the clock signal to an initialization level in response to the reset signal.

The training enable signal is activated when a set time elapses after a power source voltage begins to be supplied.

According to the above and in one or more embodiments, the data driver may test characteristics of the equalizer installed therein and may output the set signal to allow the equalizer to be operated at an optimal or desired performance level. The equalizer may be operated at the optimal or desired performance level appropriate to the data driver according to the set signal. As a result, the data driver may have optimal or desired reception performance, and a display quality of the display panel may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
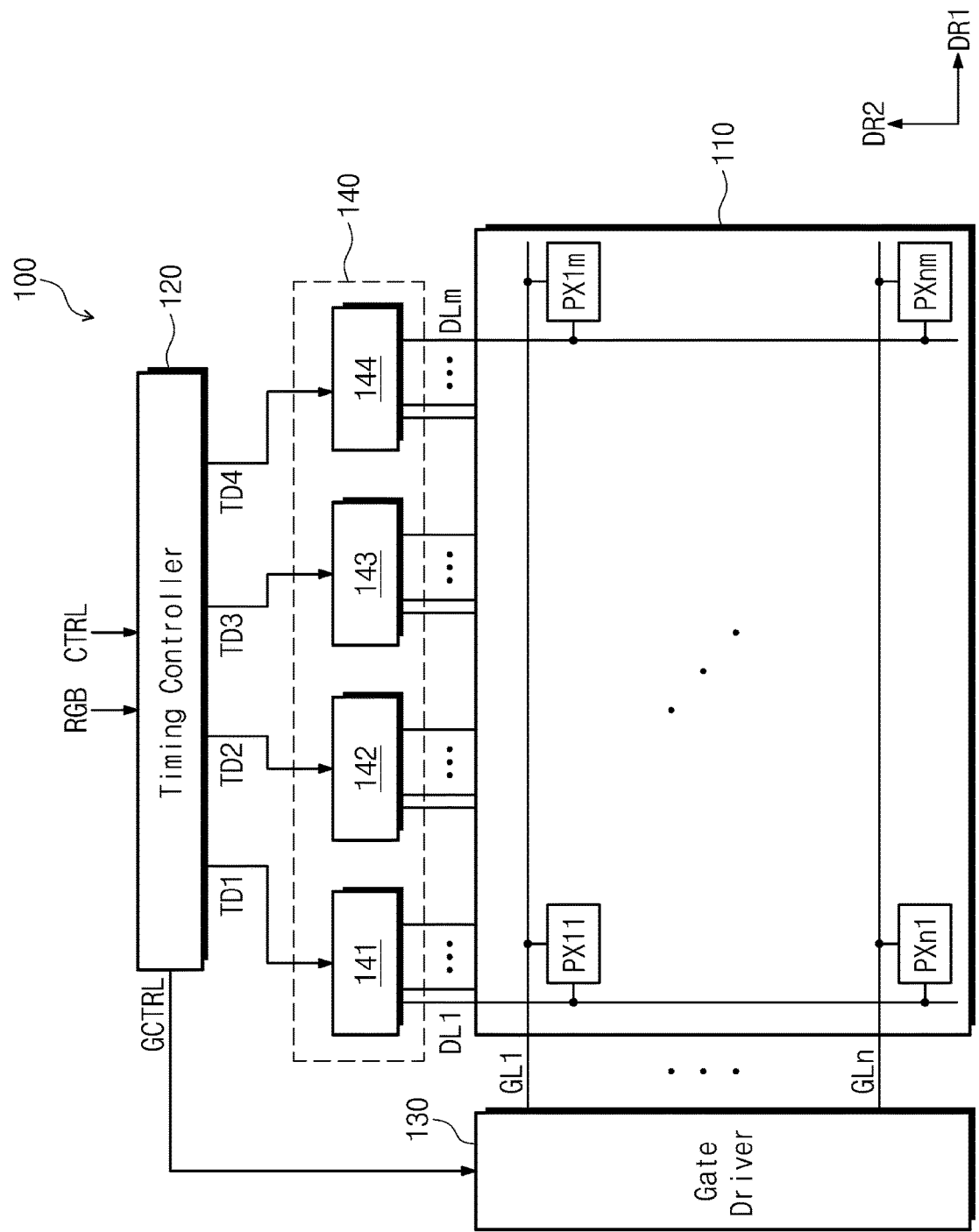
FIG. 1 is a block diagram showing a configuration of a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. Like numerals refer to like elements throughout.

As used herein, the term "and/or" includes any and all combinations of one or more of the associated listed items.

It will be understood that, although the terms first, second, etc. may be used herein to describe various suitable elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. As used herein, the singular forms, "a", "an" and "the" are intended to include the plural forms as well, unless the context clearly indicates otherwise.

The terminology used herein is for the purpose of describing particular embodiments only and is not intended to be limiting of the inventive concept. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The use of "may" when describing embodiments of the inventive concept refers to "one or more embodiments of the inventive concept." Also, the term "exemplary" is intended to refer to an example or illustration.

The display devices and/or any other relevant devices or components according to embodiments of the present disclosure described herein, such as, for example, an equalizer controller, a timing controller, a lock time counter circuit, a training circuit, a data driving circuit, a clock and recovery circuit, a data driver, and a gate driver, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, acts, operations, elements, and/or components, but do not preclude the presence or addition of one or more other features, integers, acts, operations, elements, components, and/or groups thereof.

Hereinafter, the present disclosure will be explained in more detail with reference to the accompanying drawings.

FIG. 1 is a block diagram showing a configuration of a display device 100 according to an exemplary embodiment of the present disclosure.

Referring to FIG. 1, the display device 100 includes a display panel 110, a timing controller 120, a gate driver 130, and a data driver 140. In one or more embodiment, the data driver 140 includes data driving circuits 141 to 144. In the present exemplary embodiment, the data driver 140 includes four data driving circuits 141 to 144, however, the number of the data driving circuits should not be limited to four (e.g., the number of data driving circuits may be more or less than four).

In one or more embodiments, the display panel 110 includes a plurality of data lines DL1 to DLm, a plurality of gate lines GL1 to GLn arranged to cross the data lines DL1 to DLm, and a plurality of pixels PX11 to PXnm arranged with each other in areas defined by the data lines DL1 to DLm and the gate lines GL1 to GLn. In one or more embodiments, the gate lines GL1 to GLn extend in a first direction DR1 from the gate driver 130 and are sequentially arranged with each other in a second direction DR2. In one or more embodiments, the data lines DL1 to DLm extend in the second direction DR2 from the data driver 140 and are sequentially arranged with each other in the first direction DR1. In one or more embodiments, the data lines DL1 to DLm are insulated from the gate lines GL1 to GLn while crossing the gate lines GL1 to GLn.

The timing controller 120 may receive image signals RGB and control signals CTRL, which are provided from an external source. The timing controller 120 may apply a gate control signal GCTRL to the gate driver 130 and may apply transmission signals TD1 to TD4 serialized using a clock embedded interface method to the data driving circuits 141 to 144, respectively. Each of the transmission signals TD1 to TD4 may include an image data signal and a clock signal. The timing controller 120 and the data driving circuits 141 to 144 may be directly connected to each other in a pin-to-pin method. In addition, the timing controller 120 may transmit and receive signals to and from the data driving circuits 141 to 144 using a high-speed serial interface method. The interface method between the timing controller 120 and the data driving circuits 141 to 144 uses an intra-panel interface.

The gate driver 130 may drive the gate lines GL1 to GLn in response to the gate control signal GCTRL from the timing controller 120. The gate driver 130 may be implemented in an independent integrated circuit chip and may be electrically connected to one side portion of the display panel 110. In addition, the gate driver 130 may be implemented in a circuit with an amorphous silicon gate (ASG) using an amorphous silicon thin film transistor (a-Si TFT), an oxide semiconductor, a crystalline semiconductor, a polycrystalline semiconductor, or the like and may be integrated in a predetermined or set area of the display panel 110. According to another embodiment, the gate driver 130 may be implemented in a tape carrier package (TCP) or a chip-on-film (COF).

Each of the data driving circuits 141 to 144 may drive the data lines DL1 to DLm in response to the transmission signals TD1 to TD4 from the timing controller 120. Each of the data driving circuits 141 to 144 may be implemented in an integrated circuit (IC) and may be electrically connected to one side portion of the display panel 110 or directly mounted on the display panel 110.

The interface method between the timing controller 120 and the data driving circuits 141 to 144 may be one of the high-speed serial interface methods, such as an universal serial interface (USI), a mobile industry processor interface (MIPI), a mobile display digital interface (MDDI), and an inter-integrated circuit ($I^2C$).

In one or more embodiments, switching transistors of the pixels arranged with each other in the same one row and connected to one gate line are turned on while a gate-on voltage is applied to the one gate line. In this case, the data driving circuits 141 to 144 may provide data driving signals corresponding to the image data signals included in the transmission signals TD1 to TD4 to the data lines DL1 to DLm. In one or more embodiments, the data driving signals provided to the data lines DL1 to DLm are applied to corresponding pixels through the turned-on switching transistors.

Figure 2:
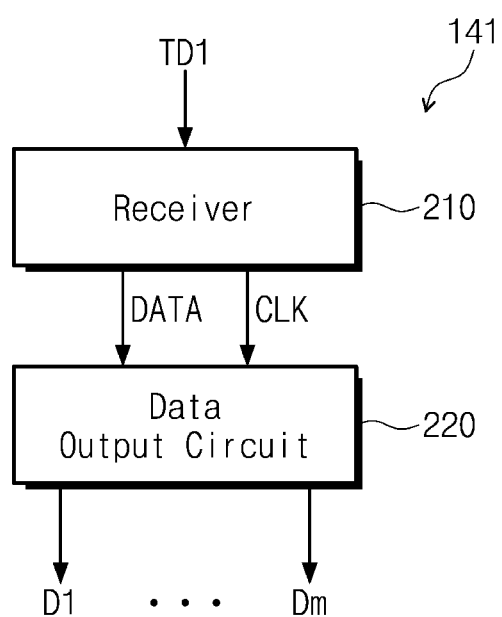
FIG. 2 is a block diagram showing a configuration of a data driving circuit according to an exemplary embodiment of the present disclosure.

FIG. 2 is a block diagram showing a configuration of the data driving circuit 141 according to an exemplary embodiment of the present disclosure. FIG. 2 shows only the data driving circuit 141, however, the other data driving circuits 142, 143, and 144 shown in FIG. 1 may have the same circuit configuration as that of the data driving circuit 141.

Referring to FIG. 2, the data driving circuit 141 includes a receiver 210 and a data output circuit 220. The receiver 210 may receive the transmission signal TD1 provided from the timing controller 120 shown in FIG. 1 and may restore data signals DATA and a clock signal CLK.

The data output circuit 220 may convert the data signals DATA to the data driving signals D1 to Dm in synchronization with the clock signal CLK. The data driving signals D1 to Dm may be respectively applied to the data lines DL1 to DLm shown in FIG. 1.

Figure 3:
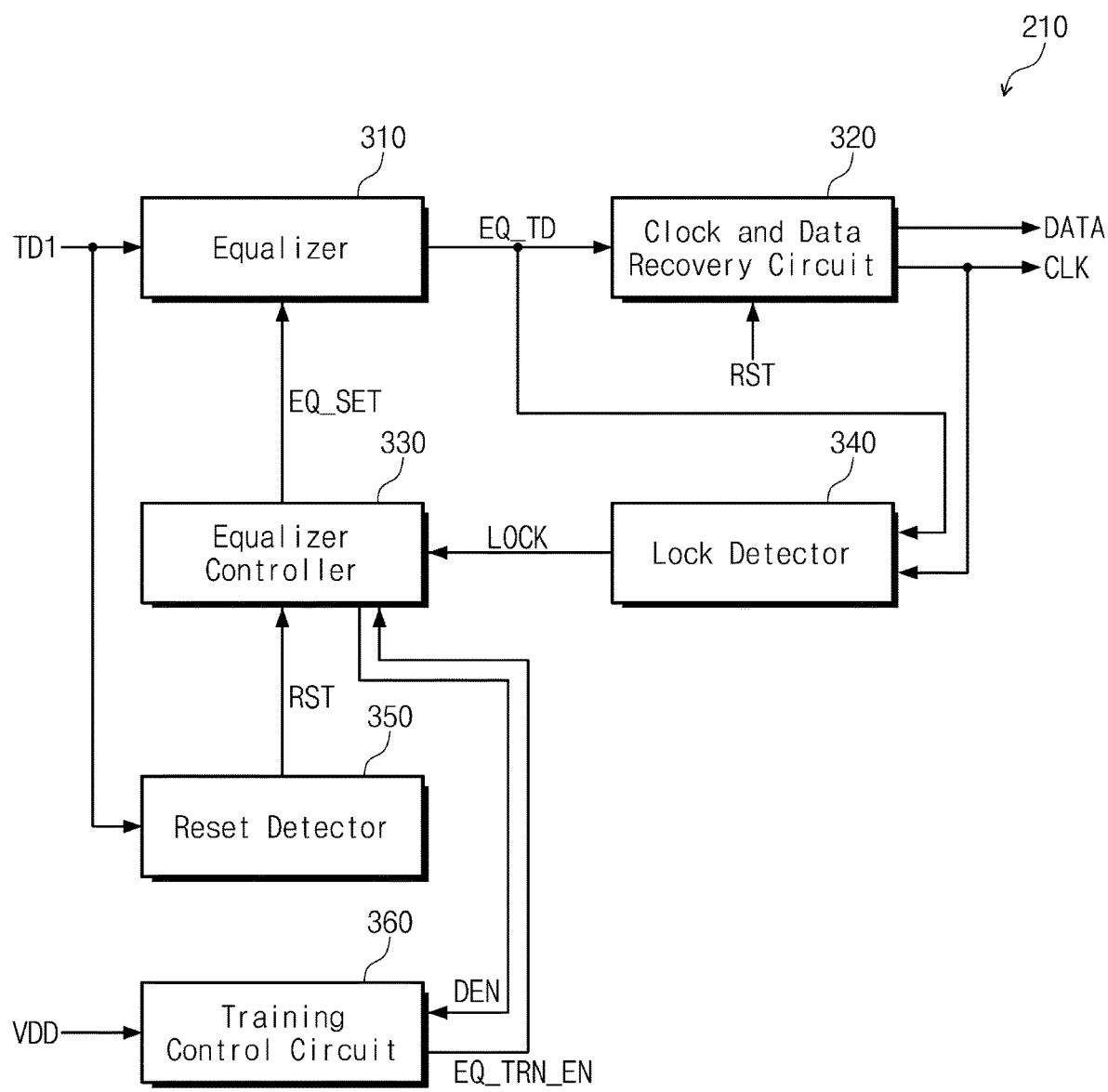
FIG. 3 is a block diagram showing a configuration of a receiver of the data driving circuit according to an exemplary embodiment of the present disclosure.

FIG. 3 is a block diagram showing a configuration of the receiver 210 of the data driving circuit 141 according to an exemplary embodiment of the present disclosure.

Referring to FIG. 3, the receiver 210 includes an equalizer 310, a clock and data recovery circuit 320, an equalizer controller 330, a lock detector 340, a reset detector 350, and a training control circuit 360.

The equalizer 310 may receive the transmission signal TD1 from the timing controller 120 shown in FIG. 1 and outputs an equalizer output signal EQ_TD in response to a set signal EQ_SET.

A frequency spectrum of the transmission signal TD1 transmitted from the timing controller 120 shown in FIG. 1 may be attenuated or distorted while being transmitted to the data driving circuit 141 through a signal path. In addition, the signal applied to the data driving circuit 141 after passing through the signal path may include a jitter. Such reduced signal quality may make it difficult to accurately restore bit information encoded in the transmission signal TD1. The equalizer 310 may execute an equalization operation to compensate for the reduction in quality of the transmission signal TD1 provided through the signal path and may output the equalizer output signal EQ_TD.

Meanwhile, the equalizer 310 may have various suitable equalizing characteristics. The equalizer 310 may be designed to be operated in an equalizing characteristic corresponding to one option code selected from a plurality of option codes. In the present exemplary embodiment, the equalizer 310 may convert the transmission signal TD1 to the equalizer output signal EQ_TD in response to the set signal EQ_SET from the equalizer controller 330.

The clock and data recovery circuit 320 may restore the clock signal CLK and the data signals DATA based on the equalizer output signal EQ_TD. The clock and data recovery circuit 320 may be initialized in response to the reset signal RST.

The lock detector 340 may output a lock signal LOCK in response to the equalizer output signal EQ_TD and the clock signal CLK.

The reset detector 350 may detect a training pattern included in the transmission signal TD1 and may output a reset signal RST. The reset detector 350 may enable the reset signal RST at a start time point of the training pattern and may disable the reset signal RST at an end time point of the training pattern.

The training control circuit 360 may receive a power source voltage VDD and outputs a training enable signal EQ_TRN_EN. For example, the training control circuit 360 may set the training enable signal EQ_TRN_EN to an active state when a predetermined or set time elapses after the power source voltage VDD begins to be supplied. The training control circuit 360 may be implemented by a delay circuit or a counter circuit, in which buffers (or inverters) are connected to each other in series, however, it should not be limited thereto or thereby. According to embodiments, the training control circuit 360 may set the training enable signal to the active state in response to a predetermined or set event signal or a predetermined or set period.

The equalizer controller 330 may output the set signal EQ_SET based on the lock signal LOCK from the lock detector 340, the reset signal RST from the reset detector 350, and the training enable signal EQ_TRN_EN.

The equalizer controller 330 may sequentially convert the set signal EQ_SET provided to the equalizer 310 to one of the option codes while the training enable signal EQ_TRN_EN is in the active state to calculate a lock time and provides the option code corresponding to an optimal or desired lock time selected from among the option codes to the equalizer 310 as the set signal EQ_SET.

The equalizer controller 330 may provide the option code having a smallest (lowest) lock time selected from among the option codes to the equalizer 310 as the set signal EQ_SET. The equalizer controller 330 may output a disable signal DEN at an active level (e.g., a high level) to the training control circuit 360 when the training operation is finished. The training control circuit 360 may change the training enable signal EQ_TRN_EN to a disabled state in response to the disable signal DEN at the active level (e.g., high level).

Figure 4:
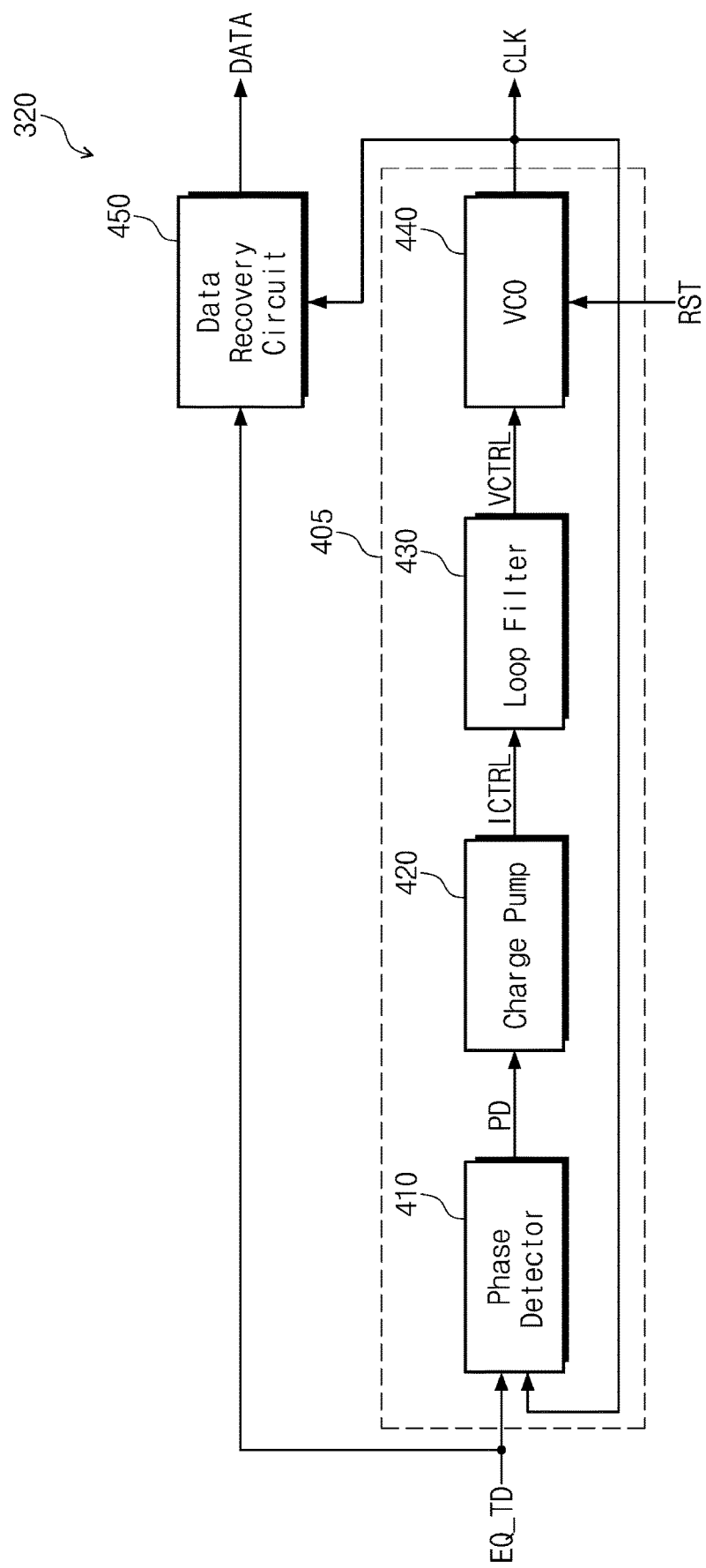
FIG. 4 is a block diagram showing a configuration of a clock and data recovery circuit according to an exemplary embodiment of the present disclosure.

FIG. 4 is a block diagram showing a configuration of the clock and data recovery circuit 320 according to an exemplary embodiment of the present disclosure.

Referring to FIG. 4, the clock and data recovery circuit 320 includes a clock recovery circuit 405 and a data recovery circuit 450. The clock recovery circuit 405 may receive the equalizer output signal EQ_TD and may output the clock signal CLK. The data recovery circuit 450 may restore the equalizer output signal EQ_TD to the data signals DATA in synchronization with the clock signal CLK.

In one or more embodiments, the clock recovery circuit 405 includes a phase detector 410, a charge pump 420, a loop filter 430, and a voltage-controlled oscillator (VCO) 440.

The phase detector 410 may detect a difference in phase between the equalizer output signal EQ_TD and the clock signal CLK and outputs a phase difference signal PD. The charge pump 420 may output a current control signal ICTRL in response to the phase difference signal PD from the phase detector 410. The loop filter 430 may output a voltage control signal VCTRL corresponding to the current control signal ICTRL. The voltage-controlled oscillator 440 may output the clock signal CLK having a frequency corresponding to a voltage level of the voltage control signal VCTRL.

The voltage-controlled oscillator 440 may set the frequency of the clock signal CLK as an initialization level in response to the reset signal RST.

Figure 5:
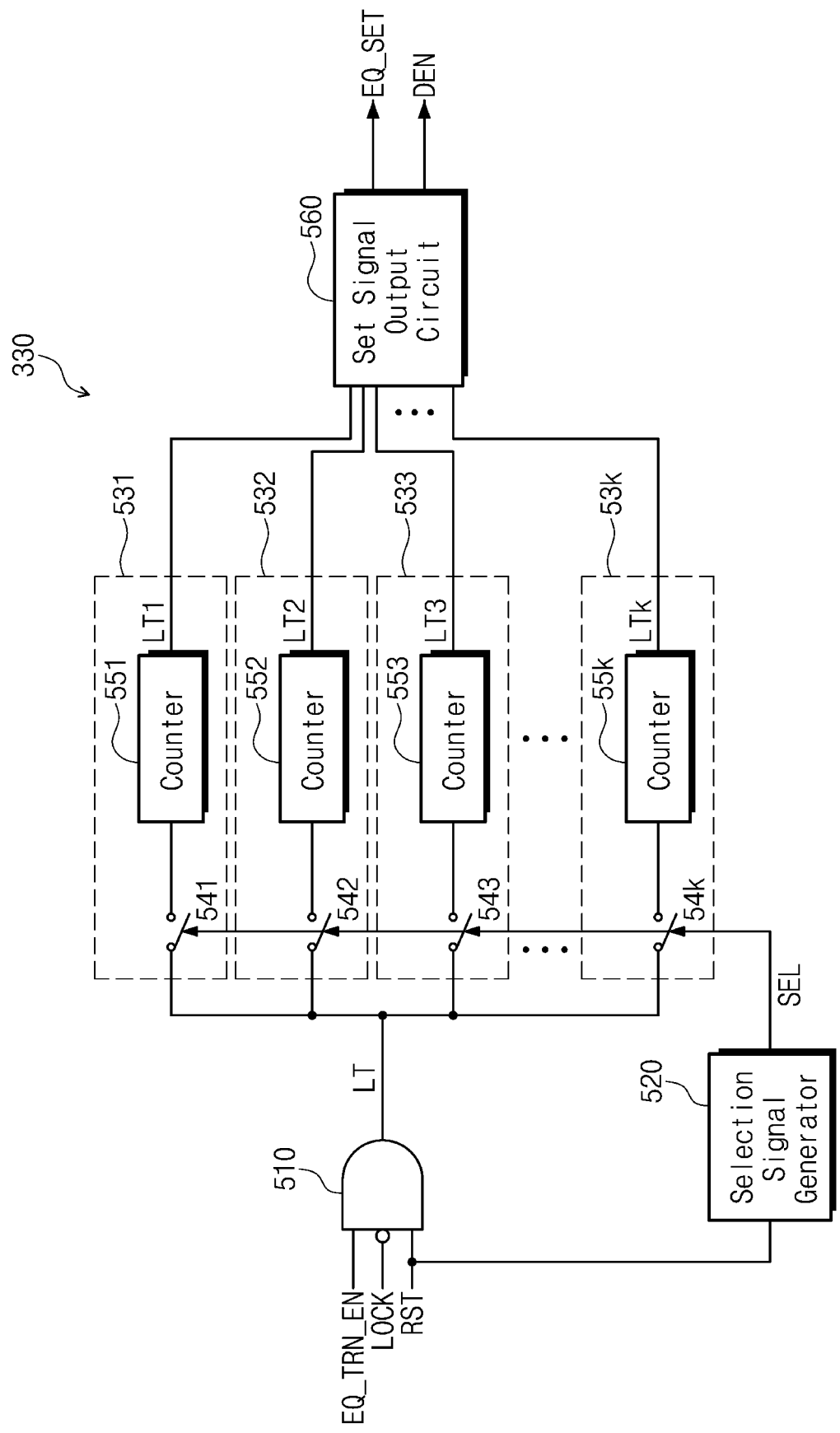
FIG. 5 is a block diagram showing a configuration of an equalizer controller according to an exemplary embodiment of the present disclosure.

FIG. 5 is a block diagram showing a configuration of the equalizer controller 330 according to an exemplary embodiment of the present disclosure.

Referring to FIG. 5, the equalizer controller 330 includes a logic circuit 510, a selection signal generator 520, lock time counter circuits 531 to 53k, and a set signal output circuit 560.

The logic circuit 510 may receive the training enable signal EQ_TRN_EN, the lock signal LOCK, and the reset signal RST and outputs a lock time signal LT.

The selection signal generator 520 may output a selection signal SEL in response to the reset signal RST.

The lock time counter circuits 531 to 53k may be enabled in response to the selection signal SEL and output count signals LT1 to LTk corresponding to a pulse width of the lock time signal LT. The lock time counter circuits 531 to 53k may correspond to the option codes, respectively. For example, when the number of the option codes is eight, the selection signal SEL is a 3-bit signal, and the number of the lock time counter circuits 531 to 53k is eight.

In one or more embodiments, the lock time counter circuit 531 includes a switch 541 and a counter 551. The lock time counter circuit 532 includes a switch 542 and a counter 552. In one or more embodiments, the lock time counter circuit 533 includes a switch 543 and a counter 553. In one or more embodiments, the lock time counter circuit 53k includes a switch 54k and a counter 55k.

Each of the switches 541 to 54k may transmit the lock time signal LT from the logic circuit 510 to a corresponding counter of the counters 551 to 55k in response to the selection signal SEL. Each of the counters 551 to 55k may output a corresponding count signal of the count signals LT1 to LTk, which corresponds to the pulse width of the lock time signal LT applied thereto through a corresponding switch.

The set signal output circuit 560 may output the option code corresponding to the count signal having the smallest (lowest) value selected from among the count signals LT1 to LTk output from the lock time counter circuits 531 to 53k as the set signal EQ_SET.

Figure 6:
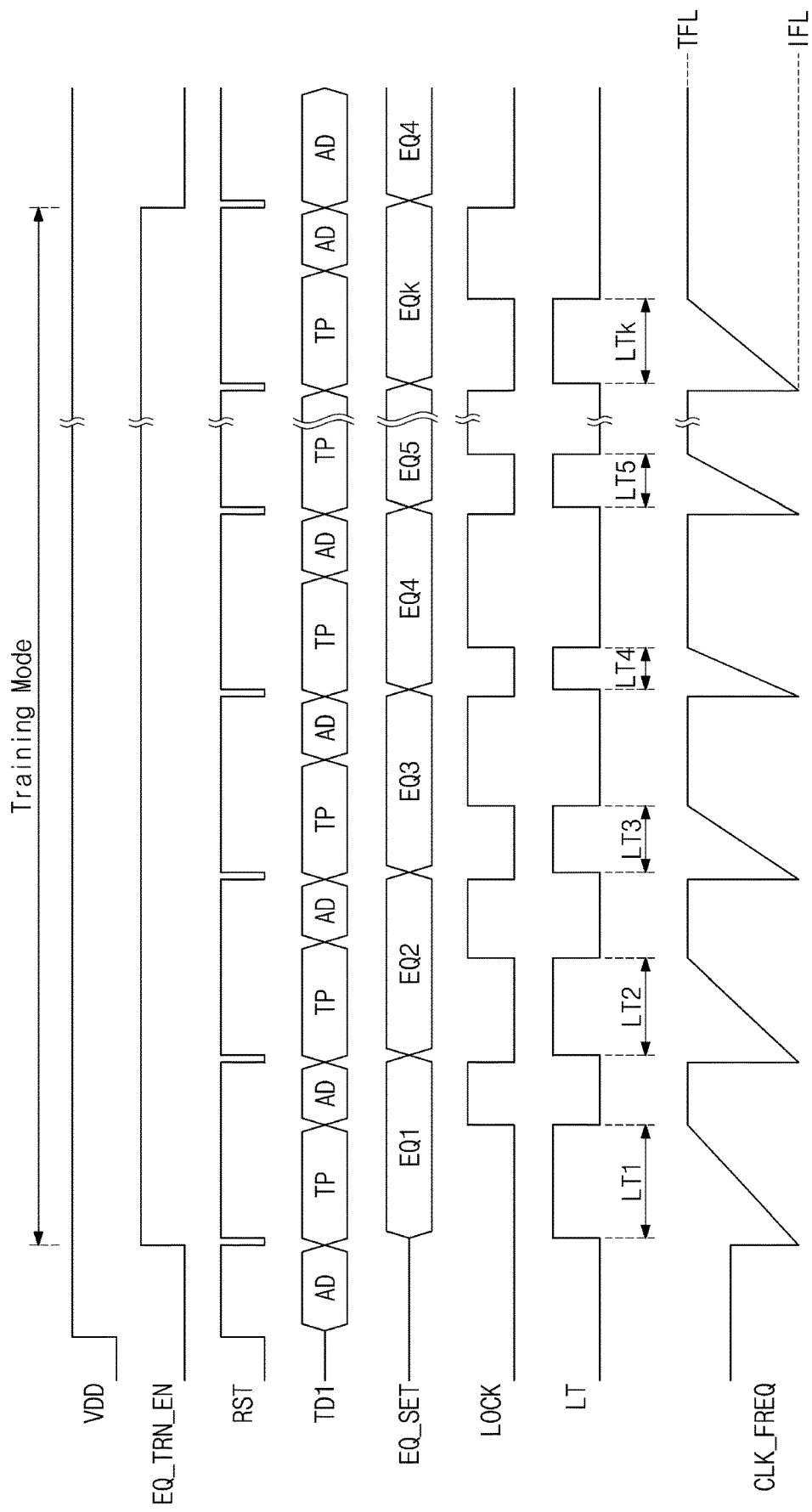
FIG. 6 is a timing diagram illustrating an operation of the receiver of the data driving circuit according to an exemplary embodiment of the present disclosure.

FIG. 6 is a timing diagram illustrating an operation of the receiver of the data driving circuit according to an exemplary embodiment of the present disclosure.

Referring to FIGS. 3 and 6, the training control circuit 360 may set the training enable signal EQ_TRN_EN to the active state (e.g., high level) when the predetermined or set time elapses after the power source voltage VDD begins to be supplied. The equalizer controller 330 may initialize the set signal EQ to one of the option codes when the training enable signal EQ_TRN_EN is transited to the high level from the low level. For instance, the equalizer controller 330 may provide a first option code EQ1 selected from among k option codes EQ1 to EQk to the equalizer 310 as the set signal EQ_SET. In the present exemplary embodiment, the equalizer controller 330 sets the k option codes EQ1 to EQk as the set signal EQ_SET in order of EQ1, EQ2, EQ3, EQk, however, the order of the option codes EQ1 to EQk may be changed in various suitable ways.

The transmission signal TD1 provided from the timing controller 120 may include active data AD and training patterns TP during a training mode after the power source voltage VDD is supplied. The reset detector 350 may distinguish the active data AD and the training patterns TP in the transmission signal TD1. The reset detector 350 may output the rest signal RST that is transited to the low level from the high level at an end time point of the active data AD and transited to the high level from the low level at a start time point of the training patterns TP.

In one or more embodiments, when reset signal RST is transited to the low level from the high level, the clock and data recovery circuit 320 sets the frequency of the clock signal CLK to an initialization frequency level IFL.

In one or more embodiments, the equalizer 310 receives the transmission signal TD1, executes the equalization operation according to the equalization characteristics corresponding to the option code EQ1 set by the set signal EQ_SET, and outputs the equalizer output signal EQ_TD.

In one or more embodiments, the clock and data recovery circuit 320 restores the clock signal CLK and the data signals DATA based on the equalizer output signal EQ_TD.

In one or more embodiments, while the training patterns PD are being received, the clock and data recovery circuit 320 generates the clock signal CLK such that the frequency of the clock signal CLK reaches a target frequency level TFL that is the frequency of the equalizer output signal EQ_TD. That is, the frequency CLK_FREQ of the clock signal CLK is gradually changed to the target frequency level TFL from the initialization frequency level IFL. In one or more embodiments, when the clock signal CLK reaches the target frequency level TFL, the lock detector 340 outputs the lock signal LOCK having the high level. In one or more embodiments, when the frequency of the clock signal CLK is changed to the initialization frequency level IFL in synchronization with the reset signal RST, the lock detector 340 outputs the lock signal LOCK having the low level.

Because the set signal EQ_SET is sequentially changed to the option codes EQ1 to EQk, the equalization characteristics of the equalizer 310 are changed, and thus the lock time during which the clock signal CLK reaches the target frequency level TFL from the initialization frequency level IFL may vary. For example, when the equalization characteristics of the equalizer 310 is optimized, the lock time during which the clock signal CLK reaches to the target frequency level TFL from the initialization frequency level IFL may be minimized or reduced. In other words, the option code that allows the clock signal CLK to quickly reach the target frequency level TFL may be the optimal or desired option code of the equalizer 310.

Referring to FIGS. 5-6, the logic circuit 510 may output the lock time signal LT having the high level when the training enable signal EQ_TRN_EN, the lock signal LOCK, and the reset signal RST have the high level, the low level, and the high level, respectively.

The selection signal generator 520 may output the selection signal SEL in response to the reset signal RST. For example, the selection signal generator 520 changes the selection signal SEL whenever the reset signal RST is transited to the high level from the low level. The selection signal SEL may be a signal to sequentially select the lock time counter circuits 531 to 53k. For instance, in the case where the equalizer controller 330 includes eight lock time counter circuits 531 to 53k, the selection signal generator 520 may output the selection signal SEL that is sequentially changed from '000' to '111' whenever the reset signal RST is transited to the high level from the low level. In addition, in one or more embodiments, the lock time counter circuits 531 to 53k correspond to the option codes EQ1 to EQk, respectively.

Accordingly, the counter 551 may receive the lock time signal LT through the switch 541 during a time period in which the set signal EQ_SET is the option code EQ1 and may output the count signal LT1 corresponding to the pulse width of the lock time signal LT. The counter 552 may receive the lock time signal LT through the switch 542 during a time period in which the set signal EQ_SET is the option code EQ2 and may output the count signal LT2 corresponding to the pulse width of the lock time signal LT. The counter 553 may receive the lock time signal LT through the switch 543 during a time period in which the set signal EQ_SET is the option code EQ3 and may output the count signal LT3 corresponding to the pulse width of the lock time signal LT. The counter 55$k$ may receive the lock time signal LT through the switch 54$k$ during a time period in which the set signal EQ_SET is the option code EQ$k$ and may output the count signal LT$k$ corresponding to the pulse width of the lock time signal LT.

Because the training enable signal EQ_TRN_EN maintains the high level during the training mode, the pulse width of the lock time signal LT may be determined depending on the lock signal LOCK and the reset signal RST.

Each of the count signals LT1 to LT$k$ corresponds to the lock time from a time point at which the reset signal RST is enabled in the high level to a time point at which the lock signal LOCK is enabled in the high level. As the lock time gets shorter, the equalization characteristics of the equalizer 310 become better, and it is desirable that the option code when the lock time is short is set as the set signal EQ_SET.

In one or more embodiments, the set signal output circuit 560 outputs the option code corresponding to the count signal having the smallest value selected from among the count signals LT1 to LT$k$ output from the lock time counter circuits 531 to 53$k$ as the set signal EQ_SET. In the exemplary embodiment shown in FIG. 6, because the count signal LT4 corresponding to the pulse width of the lock time signal LT corresponding to the option code EQ4 has the smallest value, the set signal output circuit 560 outputs the option code EQ4 as the set signal EQ_SET.

Meanwhile, the set signal output circuit 560 may output the disable signal DEN having the active level (e.g., high level) when the setting of the set signal EQ_SET is completed. The disable signal DEN is applied to the training control circuit 360 shown in FIG. 3.

The training control circuit 360 may change the training enable signal EQ_TRN_EN to an inactive state having low level in response to the disable signal DEN at the active level.

In one or more embodiments, when the training enable signal EQ_TRN_EN is transited to the disabled state, the logic circuit shown in FIG. 5 outputs the lock time signal TL at the low level, and the training mode of the equalizer controller 330 is finished.

As described above, the optimal or desired option code may be automatically set to the set signal EQ_SET while changing the option code of the equalizer 310 for the training mode. Accordingly, an equalization performance of the equalizer 310 may be optimally or desirably set in every data driving circuits 141 to 144 shown in FIG. 1.

In addition, a separate option pad used to set the option code is not required for each of the data driving circuits 141 to 144, and thus a manufacturing cost of the data driving circuits 141 to 144 may be reduced.

Figure 7:
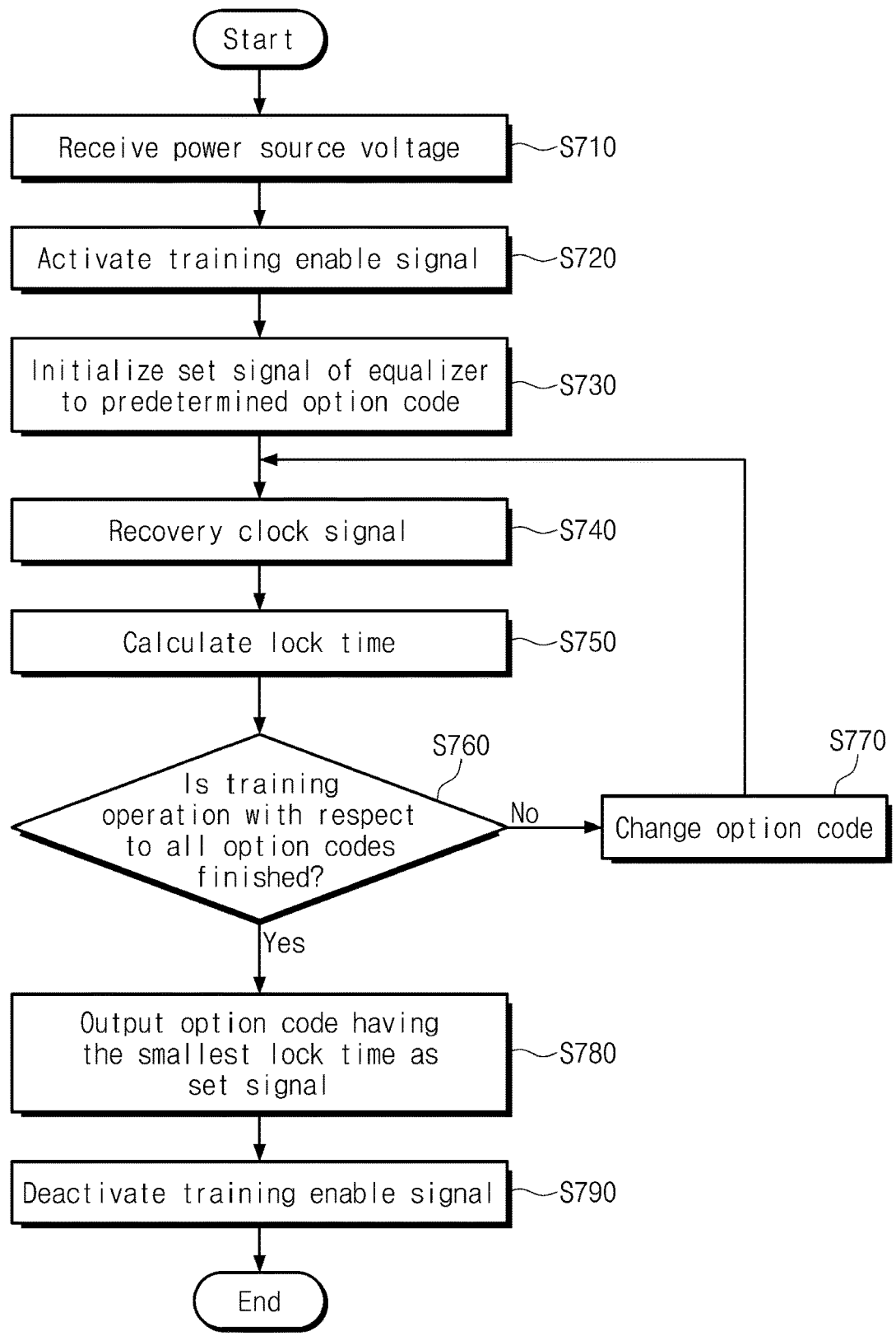
FIG. 7 is a flowchart illustrating a method of driving the display device according to an exemplary embodiment of the present disclosure.

FIG. 7 is a flowchart illustrating a method of driving the display device according to an exemplary embodiment of the present disclosure.

For the convenience of explanation, the method of driving the display device will be described with reference to the circuit configuration of the receiver of FIG. 3, however, the driving method of the display device should not be limited thereto or thereby.

Referring to FIGS. 3 and 7, the training control circuit 360 receives the power source voltage VDD (S710).

The training control circuit 360 may set the training enable signal EQ_TRN_EN to the active state when the predetermined or set time elapses after the power source voltage VDD begins to be supplied (S720).

The equalizer controller 330 may set the predetermined (set) option code selected from among the option codes EQ1 to EQ$k$ as the set signal EQ_SET (S730).

In one or more embodiments, the equalizer 310 is operated in the equalization characteristics corresponding to the set signal EQ_SET and outputs the equalizer output signal EQ_TD. The clock and data recovery circuit 320 restores the clock signal CLK (S740).

The lock detector 340 may output the lock signal LOCK based on the equalizer output signal EQ_TD and the clock signal CLK. The equalizer controller 330 calculates the lock time based on the lock signal LOCK from the lock detector 340 and the reset signal RST from the reset detector 350 (S750). The lock time may correspond to a time period in which the clock signal CLK reaches the target frequency level TFL from the initialization frequency level IFL and may be the time period from the time point at which the reset signal RST is enabled in the high level to the time point at which the lock signal LOCK is enabled in the high level.

The equalizer controller 330 determines whether the training operation of the equalizer 310 with respect to all the option codes EQ1 to EQ$k$ is completed (S760).

When there is an option code that is not trained from among the option codes EQ1 to EQ$k$, the set signal EQ_SET is changed to the option code that is not trained (S770), and the driving method of the display device returns to the clock signal recovery operation (S740) of the clock and data recovery circuit 320.

When the training operation of the equalizer 310 with respect to all the option codes EQ1 to EQ$k$ is completed, the equalizer controller 330 sets the option code having the smallest lock time as the set signal EQ_SET (S780).

In one or more embodiments, the equalizer controller 330 activates the disable signal DEN, and the training control circuit 360 changes the level of the training enable signal EQ_TRN_EN to the low level. Thus, the equalizer training mode is finished.

Although the exemplary embodiments of the present invention have been described, it is understood that the present invention should not be limited to these exemplary embodiments but various suitable changes and modifications can be made by one ordinary skilled in the art within the spirit and scope of the present invention as hereinafter claimed. Therefore, the disclosed subject matter should not be limited to any single embodiment described herein, and the scope of the present inventive concept shall be determined according to the attached claims, and equivalents thereof.

What is claimed is:

1. A data driver comprising:
an equalizer to output an equalizer output signal in response to a transmission signal and a set signal;
a clock and data recovery circuit to recover a clock signal and a data signal based on the equalizer output signal;
a lock detector to output a lock signal based on the equalizer output signal and the clock signal;
a reset detector to detect a training pattern included in the transmission signal to output a reset signal;

a training control circuit to output a training enable signal; and an equalizer controller to output the set signal based on the lock signal, the reset signal, and the training enable signal, wherein the equalizer controller is to calculate a lock time during an active state of the training enable signal while sequentially changing the set signal applied to the equalizer to one option code selected from among a plurality of option codes and to provide an option code corresponding to a set lock time selected from among the plurality of option codes to the equalizer as the set signal when the training enable signal is deactivated.

2. The data driver of claim 1, wherein the lock time is a time period from a time point at which the reset signal is enabled to a time point at which the lock signal is enabled.

3. The data driver of claim 1, wherein the equalizer controller is to provide an option code having a lowest lock time selected from among the plurality of option codes to the equalizer as the set signal.

4. The data driver of claim 1, wherein the reset detector is to output the reset signal enabled at a start time point of the training pattern included in the transmission signal.

5. The data driver of claim 1, wherein the training enable signal is transited to the active state by the training control circuit when a set time elapses after a power source voltage begins to be supplied.

6. The data driver of claim 1, wherein the equalizer controller comprises:
a logic circuit to receive the training enable signal, the lock signal, and the reset signal to output a lock time signal;
a selection signal generator to output a selection signal in response to the reset signal;
a plurality of lock time counter circuits, respectively corresponding to the plurality of option codes, wherein the plurality of lock time counter circuits is to be enabled in response to the selection signal and to output a plurality of count signals corresponding to a pulse width of the lock time signal; and
a set signal output circuit to output the option code corresponding to a count signal having a lowest value selected from among the plurality of count signals output from the plurality of lock time counter circuits as the set signal.

7. The data driver of claim 6, wherein each of the lock time counter circuits comprises:
a counter to output the count signal; and
a switch to provide the lock time signal from the logic circuit to the counter in response to the selection signal, wherein the counter is to output the count signal corresponding to the pulse width of the lock time signal applied thereto through the switch.

8. The data driver of claim 1, wherein the clock and data recovery circuit comprises:
a clock recovery circuit to receive the equalizer output signal and to output the clock signal; and
a data recovery circuit to recover the equalizer output signal to the data signal in synchronization with the clock signal.

9. The data driver of claim 8, wherein the clock recovery circuit comprises:
a phase detector to detect a difference in phase between the equalizer output signal and the clock signal;
a charge pump to generate a control current according to the detected phase difference;
a loop filter to generate a control voltage corresponding to the control current; and
a voltage-controlled oscillator to output the clock signal having a frequency corresponding to the control voltage, and to set a frequency of the clock signal to an initialization level in response to the reset signal.

10. A display device comprising:
a display panel comprising a plurality of gate lines, a plurality of data lines, and a plurality of pixels, each pixel of the plurality of pixels being connected to a corresponding gate line selected from among the plurality of gate lines and a corresponding data line of the data lines;
a gate driver to drive the gate lines;
a data driver to drive the data lines; and
a timing controller to control the gate driver and the data driver in response to a control signal and an image signal, and to convert the image signal and the control signal to a transmission signal, and to transmit the transmission signal to the data driver, the data driver comprising:
an equalizer to output an equalizer output signal in response to the transmission signal and a set signal;
a clock and data recovery circuit to recover a clock signal and a data signal based on the equalizer output signal;
a lock detector to output a lock signal based on the equalizer output signal and the clock signal;
a reset detector to detect a training pattern included in the transmission signal to output a reset signal;
a training control circuit to output a training enable signal; and
an equalizer controller to output the set signal based on the lock signal, the reset signal, and the training enable signal, wherein the equalizer controller is to calculate a lock time during an active state of the training enable signal while sequentially changing the set signal applied to the equalizer to one option code of a plurality of option codes and to provide an option code corresponding to a set lock time selected from among the plurality of option codes to the equalizer as the set signal when the training enable signal is deactivated.

11. The display device of claim 10, wherein the lock time is a time period from a time point at which the reset signal is enabled to a time point at which the lock signal is enabled.

12. The display device of claim 10, wherein the equalizer controller is to provide an option code having a lowest lock time selected from among the plurality of option codes to the equalizer as the set signal.

13. The display device of claim 10, wherein the equalizer controller comprises:
a logic circuit to receive the training enable signal, the lock signal, and the reset signal to output a lock time signal;
a selection signal generator to output a selection signal in response to the reset signal;
a plurality of lock time counter circuits, respectively corresponding to the option codes, wherein the plurality of lock time counter circuits is to be enabled in response to the selection signal, and to output a plurality of count signals corresponding to a pulse width of the lock time signal; and
a set signal output circuit to output the option code corresponding to a count signal having a lowest value selected from among the plurality of count signals output from the lock time counter circuits.

14. The display device of claim 13, wherein each of the plurality of lock time counter circuits comprises:

a counter to output the count signal; and a switch to provide the lock time signal from the logic circuit to the counter in response to the selection signal, wherein the counter is to output the count signal corresponding to the pulse width of the lock time signal applied thereto through the switch.

15. The display device of claim 10, wherein the clock and data recovery circuit comprises:

a phase detector to detect a difference in phase between the equalizer output signal and the clock signal;

a charge pump to generate a control current according to the detected phase difference;

a loop filter to generate a control voltage corresponding to the control current;

a voltage-controlled oscillator to output the clock signal having a frequency corresponding to the control voltage; and a data recovery circuit to recover the equalizer output signal to the data signal in synchronization with the clock signal, wherein the voltage-controlled oscillator is to set the frequency of the clock signal to an initialization level in response to the reset signal.

16. A method of driving a display device, the method comprising:

activating a training enable signal;

initializing a set signal of an equalizer to one of a plurality of option codes;

recovering a clock signal based on an equalizer output signal output from the equalizer;

sequentially changing the set signal to one of the plurality of option codes to calculate a lock time of the clock signal corresponding to the option codes; and outputting an option code having a lowest lock time selected from among the plurality of option codes as the set signal.

17. The method of claim 16, further comprising detecting a training pattern included in a transmission signal to output a reset signal, wherein the equalizer outputs the equalizer output signal in response to the transmission signal and the set signal.

18. The method of claim 17, wherein the lock time is a time period from a time point at which the reset signal is enabled to a time point at which the clock signal reaches a target frequency.

19. The method of claim 17, wherein the recovering the clock signal based on the equalizer output signal output from the equalizer comprises:

detecting a difference in phase between the equalizer output signal and the clock signal;

generating a control current according to the detected phase difference;

generating a control voltage corresponding to the control current; and outputting the clock signal having a frequency corresponding to the control voltage, wherein the outputting of the clock signal comprises setting the frequency of the clock signal to an initialization level in response to the reset signal.

20. The method of claim 16, wherein the training enable signal is activated when a set time elapses after a power source voltage begins to be supplied.

* * * * *